United States Patent [19]

Slonneger

[11] Patent Number: 5,074,449
[45] Date of Patent: Dec. 24, 1991

[54] PAPER CUTTING APPARATUS

[76] Inventor: Stephen Slonneger, 13176 Fenton, Sylmar, Calif. 91342

[21] Appl. No.: 598,855

[22] Filed: Oct. 15, 1990

[51] Int. Cl.$^5$ .............................. B26F 3/02; B41J 11/70
[52] U.S. Cl. ........................................ 225/91; 225/77; 358/304
[58] Field of Search ....................... 225/19, 39, 76, 77, 225/88, 91; 358/304, 305; 379/100

[56] References Cited
U.S. PATENT DOCUMENTS

| 429,566 | 6/1890 | Ford et al. | 225/76 |
| 2,834,557 | 5/1958 | Graham | 225/77 |

FOREIGN PATENT DOCUMENTS 1218492  6/1966  Fed. Rep. of Germany ........ 225/91

Primary Examiner—Hien H. Phan
Assistant Examiner—Raymond D. Woods
Attorney, Agent, or Firm—Rapkin, Gitlin & Moser

[57] ABSTRACT

A paper cutting apparatus for use in combination with a facsimile telecommunications machine to neatly and efficiently sever paper dispensed from a facsimile machine. The apparatus of the present invention is usually of a unitary construction and includes two (2) main elements: a base plate, which is generally elongated and flat, and an end plate formed integrally therewith. The end plate is bent at an angle of approximately one hundred and five (105) to one hundred and twenty (120) degrees relative to the base. The end plate incorporates a slotted opening in which the cutting edge is formed.

9 Claims, 2 Drawing Sheets

PAPER CUTTING APPARATUS

FIELD OF INVENTION

The present invention relates generally to the area of paper cutting devices and more particularly to an apparatus designed and constructed primarily as a portable unit for use in combination with a facsimile telecommunications machine to facilitate the cutting of paper dispensed from a roll inside the machine.

DESCRIPTION OF THE PRIOR ART

Facsimile telecommunications machines have been in use and known in the prior art for many years and include a variety of features offered for convenience to the user. One such feature or accessory is the automatic paper cutting device incorporated inside the machine itself. As a communication is printed onto the paper, the paper bearing the communication is dispensed from a roll inside the machine. A device, typically located near the dispensing opening, automatically cuts the paper according to the length of the original document fed from the source. This feature, though very convenient and clearly quite useful, is often one of the more costly features offered with such machines. Consequently, first time users and buyers will often decide against purchasing the feature to minimize the overall cost of the product. Not until later, after the purchase is made and the machine is operating on a regular basis, does the new owner realize the mistake he may have made in his failure to purchase a machine with the automatic paper cutting feature.

Facsimile machines that do not include an automatic paper cutting device inside the unit itself require, by necessity, some exterior and independent means to cut the paper as it is dispensed. Given the potential, though more likely the reality, of extremely lengthy facsimile transmissions, machines without automatic paper cutting devices can and do generate unmanageable rolls of paper requiring tedious cutting efforts afterwards in order to conform the transmission individually to the size of the original documents fed from the source.

Previous means to cut paper dispensed from a machine without an automatic paper cutter include the use of the lever type paper cutter normally found in most office environments; a sharp edge, such a knife or scissors; or, in a few instances, the usually relatively dull edge that defines the machine's paper dispensing opening. For obvious reasons, these methods have their drawbacks. The use of the lever type paper cutter, knife or scissor involves the cumbersome task of spreading out or unrolling the paper containing the transmission, determining the point at which each cut must be made and then individually severing each page to conform to the size of the original document(s). Not only is this task a tedious and time consuming one, it also exposes the operator to some degree of risk due to the use of sharp instruments. Cutting the paper along the edge of the paper dispensing opening in the machine also presents problems, due largely to the difficulty in having to sever the document neatly against a dull edge while the paper is constantly moving. Without the ability to hold the paper steady on one side of the opening while attempting to tear the paper from the other side, the desired result is usually difficult to obtain.

SUMMARY OF THE INVENTION

The present invention provides for a portable paper cutting apparatus for use in combination with a facsimile telecommunications machine. The paper cutting apparatus is used to neatly and efficiently sever paper dispensed from a facsimile machine to avoid the cumbersome and time consuming task later on of having to cut seemingly unending streams of facsimile communications to conform with the size of the original documents fed from the source. The paper cutting apparatus of the present invention is usually of a unitary construction and includes two (2) main elements: a base plate and an end plate formed integrally therewith. The base plate is generally elongated and flat. The end plate, which is formed integrally with the base plate at one end thereof, is bent at an obtuse angle ranging from approximately one hundred and five (105) to one hundred and twenty (120) degrees relative to the base plate. The end plate incorporates a slotted opening in which the cutting edge is formed. The cutting edge extends almost the entire length of the opening and may be serrated, if desired. The apparatus is designed to adapt to almost any kind of facsimile machine notwithstanding its size, shape or weight.

The device of the present invention is light weight, normally of a unitary construction and includes two (2) main elements: an end plate, which includes a cutting edge, and a base section. The cutting edge is incorporated into an elongated slotted opening located in the end plate situated at one end of the base section. The length of the opening is slightly less than the width of the base. The opening has a width sufficiently large enough to easily accommodate the thickness of facsimile paper. The base section bears the weight of the facsimile machine for stabilizing the cutting apparatus and ensuring an accurate and constant alignment between the cutting edge inside the slotted opening and the paper dispensing slot in the machine. Though simple in design and construction, the device is widely adaptable for use with facsimile machines of all shapes, sizes and weights. Also, due to its convenient size and light weight, the device is extremely portable.

Thus, the present invention resolves the problems associated with the prior art by providing a portable device which easily and efficiently severs paper produced from a facsimile machine, is simple in design and construction and adaptable for use with a wide range of facsimile machines of varying shapes, sizes and weights.

The unitary, light weight and uncomplicated nature of the present invention provides an extremely inexpensive and convenient means for accomplishing apart from a facsimile machine itself the identical objective achieved by a much more expensive and complex automatic severing device which is normally incorporated inside the machine.

The present invention solves the problems associated with the devices and methods of the prior art by providing a device which can easily be slipped beneath a facsimile machine, thus using the weight of the machine to stabilize the device to maintain the cutting edge in a stationary position. The slotted opening in the end plate of the device which incorporates the cutting edge is then carefully aligned with the opening in the machine through which the paper is dispensed. This enables the paper, as it moves through that opening, to be guided easily and accurately towards the cutting edge of the apparatus for severing at the designated points. The weight of the facsimile machine ensures the steadiness of the apparatus and prevents movement at the moment that each individual sheet of paper is severed from the roll.

Accordingly, an object of the present invention is to provide a portable paper cutting apparatus that can be used in combination with a facsimile telecommunications machine to conveniently sever paper of any desired length from the paper roll inside the machine.

Another object of the present invention is to provide a portable paper cutting apparatus that can be adapted for use in combination with facsimile telecommunications machines of varying sizes, shapes and weights.

Still another object of the present invention is to provide a portable paper cutting apparatus that can be detachably mounted under facsimile telecommunications machines of varying sizes, shapes and weights.

Still yet another object of the present invention is to provide a portable paper cutting apparatus that is convenient to use and easy to manufacture.

Still yet another object of the present invention is to provide a portable paper cutting apparatus that is extremely lightweight.

Still yet another object of the present invention is to provide a portable paper cutting apparatus for use in conjunction with a facsimile telecommunications machine which does not include an automatic paper cutting device.

Other objects and advantages of the present invention will become apparent in the following specifications when considered in light of the attached drawings wherein a preferred embodiment of the invention is illustrated.

A BRIEF DESCRIPTION OF THE DRAWINGS

DETAILED DESCRIPTION OF THE PREFERRED EMBODIMENT

Figure 1:
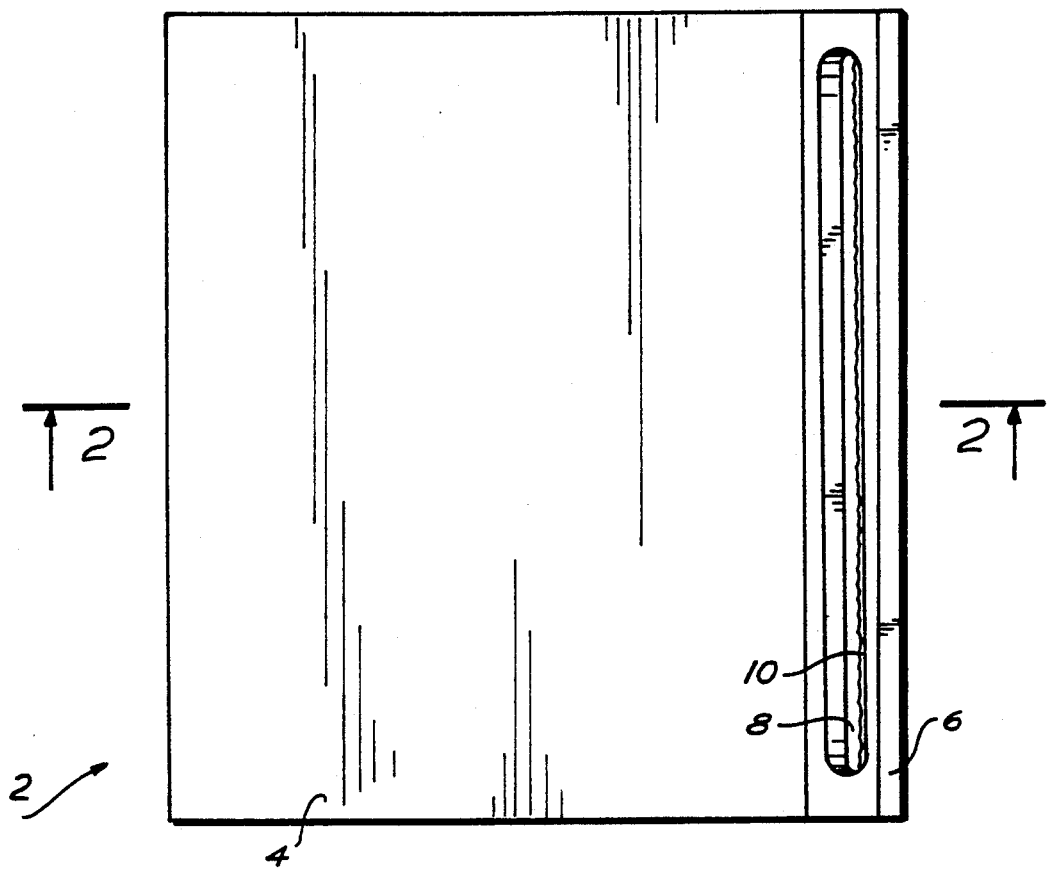
FIG. 1 is a plan view of the paper cutting apparatus of the present invention.
Figure 2:
FIG. 2 is a sectional view of the paper cutting apparatus of the present invention taken along line 2—2 FIG. 1.
Figure 3:
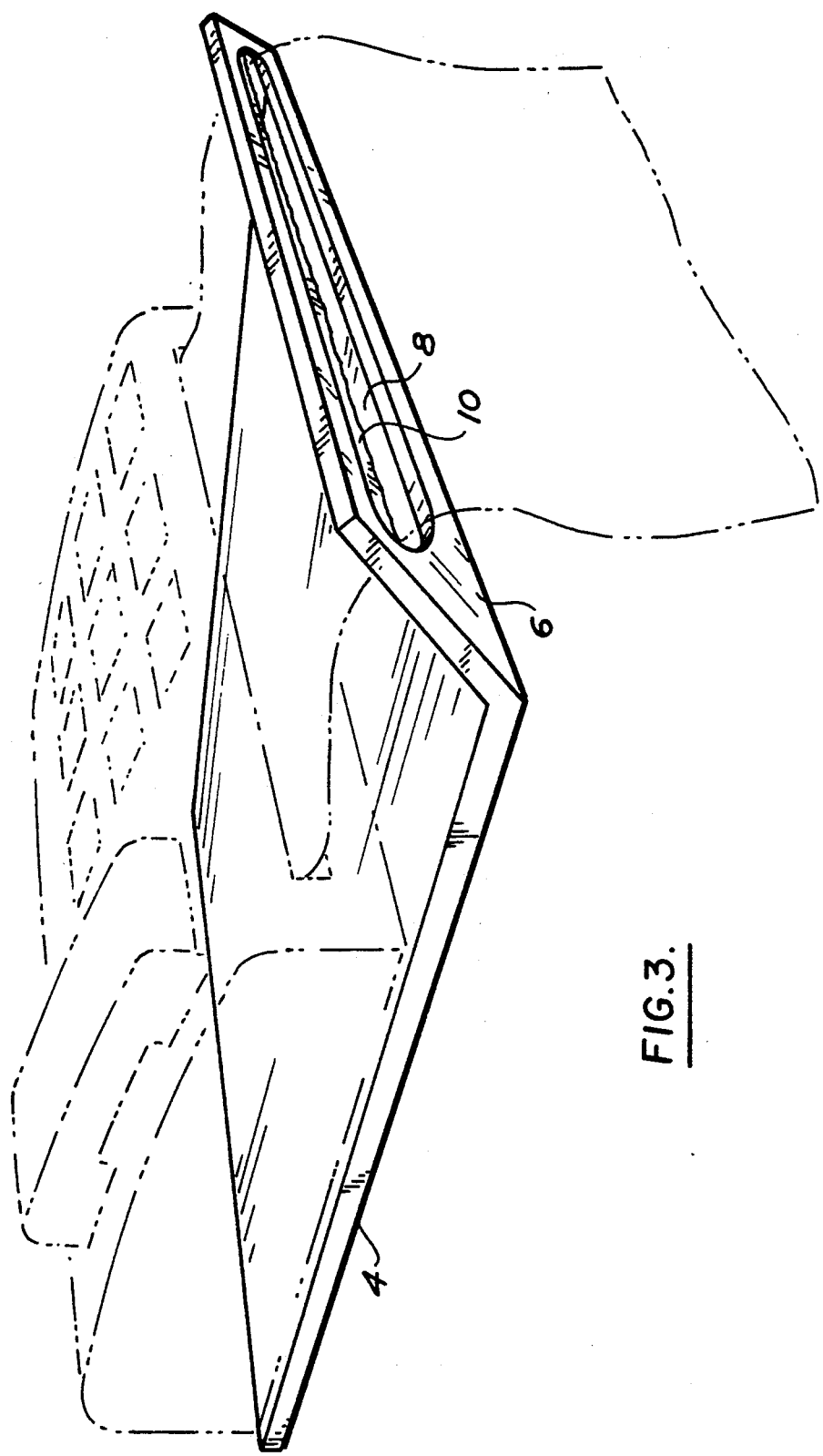
FIG. 3 is a perspective view of the paper cutting apparatus of the present invention shown in combination with a facsimile telecommunications machine depicted in phantom.

Referring more particularly to the drawings, FIG. is a plan view of the paper cutting apparatus 2 of the present invention in its preferred form. Apparatus 2 is comprised of two (2) main elements, namely a base plate 4 and an end plate 6 in which there is formed an elongated slotted opening 8 incorporating a cutting edge 10. Edge 10 may be a simple straight edge or serrated, as desired. End plate 6, which is integrally formed with base plate 2, is bent at an angle ranging from approximately one hundred and five (105) to one hundred and twenty (120) degrees relative to base plate 4.

In a typical application of the present invention, base plate 4 is slipped underneath the bottom section of a facsimile telecommunications machine, and the end plate 6, more particularly the opening 8, is positioned generally opposite and in substantial alignment with the opening in the facsimile machine through which the paper is dispensed from a roll located inside the machine. When the paper containing the facsimile transmission begins to flow from the dispensing opening in the machine, the end of the paper is guided by the user through the opening 8. Each page is then severed from the main roll at the appropriate point in the sequence of the transmission. This can be done either by pulling up on the paper against the cutting edge 10, which may be located along the top edge of opening 8, or by severing the paper against cutting edge 10, which may instead be located along the bottom edge of opening 8. Either arrangement may be utilized, depending upon the space requirements and other factors affecting the working area around the facsimile machine. Notwithstanding, the user's personal preference may be overriding.

Apparatus 2 is typically fabricated of a metal alloy, such as aluminum, and is unitary in construction. By necessity and design, apparatus 2 is also lightweight. The angle of the end plate 6 relative to the base plate 4 can be critical to the proper positioning of the apparatus 2 with facsimile machines incorporating top and front paper feeds. Since it is also critical for the cutting edge 10 to remain stationary at the moment the paper is severed, the base plate 4 has been designed to adapt almost universally with all types of facsimile machines, which range widely in terms of shape, size and weight.

While the invention will be described in connection with a certain preferred embodiment, it is to be understood that it is not intended to limit the invention to that particular embodiment. Rather, it is intended to cover all alternatives, modifications and equivalents as may be included within the spirit and scope of the invention as defined by the appended claims.

I claim:

1. A detachably engaged paper cutting apparatus in combination with a facsimile telecommunications device adjustably mounted thereon comprising:
    a. an elongated member having a slotted opening integrally formed therein said slotted opening defining a cutting edge; and,
    b. a generally flat member formed integrally with said elongated member, said elongated member forming an obtuse angle with said flat member such that the paper arriving from the telecommunications device is guided into said slotted opening and guided therethrough, said flat member defining a surface to engage and support the weight of the telecommunications device so that the paper cutting apparatus is fixed in a stationary and generally immovable position and its position is adjustable relative to the paper cutting apparatus.

2. The paper cutting apparatus of claim 1 wherein said slotted opening is aligned generally with a paper dispensing opening in the telecommunications device to receive said paper therethrough.

3. The paper cutting apparatus of claim 2 wherein said cutting edge extends substantially along the entire length of said slotted opening.

4. The paper cutting apparatus of claim 3 wherein said cutting edge is serrated.

5. The paper cutting apparatus of claim 1 wherein said apparatus is constructed of an alloy.

6. The paper cutting apparatus of claim 1 wherein said apparatus is constructed of aluminum.

7. The paper cutting apparatus of claim 1 wherein said apparatus is adaptable for use with telecommunications devices of various sizes, shapes and weights.

8. The paper cutting apparatus of claim 1 wherein said obtuse angle is approximately one hundred and twenty (120) degrees.

9. The paper cutting apparatus of claim 1 wherein said obtuse angle is approximately one hundred and five (105) degrees.

* * * * *